United States Patent
Yasue

(10) Patent No.: US 6,545,082 B2
(45) Date of Patent: *Apr. 8, 2003

(54) COATING MATERIAL

(75) Inventor: Takaharu Yasue, Sodegaura (JP)

(73) Assignee: Idemitsu Petrochemical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/446,341

(22) PCT Filed: Apr. 21, 1999

(86) PCT No.: PCT/JP99/02112

§ 371 (c)(1), (2), (4) Date: Dec. 16, 1999

(87) PCT Pub. No.: WO99/54419

PCT Pub. Date: Oct. 28, 1999

(65) Prior Publication Data

US 2002/0010233 A1 Jan. 24, 2002

(30) Foreign Application Priority Data

Apr. 23, 1998 (JP) ............................. 10-113556

(51) Int. Cl.$^7$ ................................. C08K 3/00
(52) U.S. Cl. ................. 524/500; 524/17; 524/18; 524/19; 524/20; 524/21; 524/22; 524/23; 524/24
(58) Field of Search .................. 524/500, 17, 18, 524/19, 20, 21, 23, 24

(56) References Cited

U.S. PATENT DOCUMENTS

| | | | |
|---|---|---|---|
| 2,970,365 A | 2/1961 | Morgenstern | |
| 3,250,638 A | 5/1966 | Lassiter | |
| 3,403,116 A | 9/1968 | Ream et al. | |
| 4,124,548 A | 11/1978 | Gillan et al. | |
| 4,531,975 A | * 7/1985 | Salome | 106/18.3 |
| 4,543,106 A | * 9/1985 | Parekh | 51/295 |
| 4,590,022 A | * 5/1986 | Cioca | 264/41 |
| 4,788,087 A | * 11/1988 | Wilke | 428/34.8 |
| 5,064,868 A | * 11/1991 | Simpson | 521/64 |
| 5,238,736 A | 8/1993 | Tseng et al. | |
| 5,387,463 A | * 2/1995 | Nakamura | 428/327 |
| 5,691,410 A | * 11/1997 | Escarsega | 524/591 |
| 5,800,861 A | * 9/1998 | Chiang | 427/160 |
| 6,083,581 A | * 7/2000 | Lacoste-Borgeacq | 428/34.8 |
| 6,111,699 A | * 8/2000 | Iwata | 359/599 |
| 6,133,342 A | * 10/2000 | Mizobuchi | 523/161 |
| 6,395,356 B1 | * 5/2002 | Wielockx | 428/34.8 |

FOREIGN PATENT DOCUMENTS

| | | |
|---|---|---|
| DE | 1 669 156 | 5/1971 |
| EP | 0 522 454 | 1/1993 |
| EP | 0 796 947 | 9/1997 |
| JP | 59-47991 | 11/1984 |
| JP | 2-3433 | 1/1990 |
| JP | 3-63586 | 10/1991 |
| JP | 6-57218 | 3/1994 |

* cited by examiner

*Primary Examiner*—Edward J. Cain
(74) *Attorney, Agent, or Firm*—Flynn, Thiel, Boutell & Tanis, P.C.

(57) ABSTRACT

A coating material contains at least one substance selected from the group consisting of water-soluble resin such as water-soluble acryl resin, resin emulsion such as acryl emulsion and solvent resin such as solution of urethane resin into a solvent (A); resin beads such as polyethylene beads (B); and at least one substance selected from the group consisting of soluble protein such as collagen and resin emulsion incompatible with the (A) such as ethylene-acryl copolymer (C). (A) improves adhesion with a base member, (B) improves heat sealability and (C) improves surface lubricity and anti-blocking properties. Further, water-soluble amine additive (D) may be added to improve adhesion with olefin base member.

24 Claims, No Drawings

COATING MATERIAL

TECHNICAL FIELD

The present invention relates to a coating material to be coated on a resin sheet etc. for preventing blocking or the like caused when the resin sheet etc. are superposed.

BACKGROUND ART

Conventionally, resin sheets (or films) having flat surface generally have no surface lubricity and are likely to cause blocking (a phenomenon where solid surfaces are stuck together to form continuity of mutual materials), which results in following problems.

For instance, when the blocking is caused to a raw fabric (wound sheet in roll shape) of a sheet, the sheet cannot be unrolled from the raw fabric. Further, when the sheet is cut while being superposed, the blocking is caused between the sheets by being pressed during cutting process, so that the sheets are bonded with each other and are unable to peel off.

Further, since such sheets having flat surface has no surface lubricity, fabrication quality (handling ability during processing) is extremely bad.

For solving the above problem, starch powder etc. is conventionally sprayed onto the sheet surface or an appropriate coating material is coated thereon.

However, when the powder is sprayed onto the sheet, following problem arises.

The powder on the surface scatters around at a manufacturing facility and working environment is deteriorated. Further, when printing is conducted on the sheet, the powder sticks to a printing roller, thereby requiring frequent cleaning of the roller. Further, the sheet surface is likely to be damaged by the powder.

On the other hand, though coated sheet does not cause the above problems on account of the powder, following problems arise.

It is difficult for the conventional coating material to achieve both adhesion to the sheet and heat sealability. In other words, a coating material having good adhesive properties is inferior in heat sealability. On the contrary, a coating material having good heat sealability is inferior in adhesive properties to the sheet. Further, inorganic filler is generally added to the conventional coating material for avoiding blocking and deterioration of surface lubricity, which results in inferior transparency thereof. Silicone is sometimes blended to the coating material for imparting surface lubricity. However, a sheet coated by a coating material blended with silicone is inferior in printability thereof. Especially, polyolefin type sheet is inferior in adhesive properties with the coating material, thereby impairing applicability.

As conventional related arts, a releasable wrapping film with a release coating agent including inorganic lubricant, wax etc. (Japanese Patent Publication No. Sho 59-47991), film coating compounds composed of acrylic copolymer and slipping agent (Japanese Patent Laid-Open Publication No. Hei 2-3433), and a heat sealable covering film coated with a coating fluid made of emulsion composed of particular wax and inorganic lubricant added to polyvinyl chloride vinylidene emulsion (Japanese Patent Publication No. Hei 3-63586) has been proposed.

Incidentally, a sheet applied with the above-described coating material is bonded as necessary in assembling as a wrapping box etc.

Among the resin sheets, since olefin sheet and film are inferior in adhesivity, such sheets cannot be bonded by general polyurethane adhesive and cyanoacrylate adhesive is often used. Further, even when the cyanoacrylate adhesive is used, a primer coating is conducted to the sheet surface for enhancing adhesivity thereof prior to bonding 2-cyanoacrylate primer for instant adhesive including tertiary amine as a long-chain carbon hydride group having carbon number of 8 to 24 has been proposed as such primer (Japanese Patent Application No. Hei 4-237837).

However, following problems occur in bonding accompanying such primer coating.

The primer coating before bonding increases steps in fabrication, which result in higher production cost.

Further, even if the primer coating is conducted, stable adhesivity may not be sufficiently obtained since the adhesivity of the sheet itself is not improved.

A primary object of the present invention is to provide a coating material capable of enhancing anti-blocking property and surface lubricity without deteriorating adhesive properties with the sheet, heat sealability, transparency and printability thereof Another object of the present invention is to provide a coating material capable of enhancing adhesivity of the sheet itself as well as being capable of improving the above anti-blocking properties.

Disclosure of the Invention

A coating material according to first aspect of the present invention includes at least one substance selected from the group consisting of water-soluble resin, resin emulsion and solvent resin (A) and resin beads (B).

Above (A) is a low-molecular-weight resin for enhancing adhesion with a base member.

Specific example of the water-soluble resin is water-soluble acryl resin, water-soluble polyurethane resin, water-soluble polyester and the like.

Specific example of the resin emulsion is acryl emulsion, polyurethane emulsion, polyester emulsion and the like.

Specific example of the solvent resin is a solution of urethane resin, acryl resin polyvinyl chloride resin etc. into a solvent composed of at least one substance selected from dimetylformamide (DMF), methyl ethyl ketone (MEK), toluene, cyclohexane, butyl acetate etc.

Content of the (A) component is preferably 0.1 to 50.0 wt %. When the content is less than 0.1 wt %, stable coating is difficult. When the content exceeds 50.0 wt %, fabrication can be deteriorated.

The resin beads (B) are contained for improving heat sealability.

Specific example of the resin beads is polyethylene beads, acryl beads, nylon beads, polyester beads, polypropylene beads and the like.

The content of the beads is preferably 0.01 to 20.0 wt %. When the content is less than 0.01 wt %, enough improving effect of the heat sealability cannot be obtained. When the content is more than 20.0 wt %, transparency is lowered.

Average particle size of the beads is preferably not more than 20 $\mu$m, more preferably not more than 10 $\mu$m. When the average particle size exceeds 20 $\mu$m, roughness is felt to deteriorate touch, which may also cause dropout of beads.

A coating material according to second aspect of the present invention includes at least one substance selected from a group consisting of water-soluble resin, resin emulsion and solvent resin (A) and at least one substance selected from the group consisting of soluble protein and resin emulsion incompatible with the (A) component (C).

The detail of above (A) is the same as described in the first aspect of the present invention.

The component (C) is contained for improving surface lubricity and anti-blocking properties of the base member.

Specific example of the soluble protein is whey (serum lactis), egg white, silk (fibroin), collagen, casein, gelatin, sericin, serum protein etc. The egg white is an albumen of egg of chicken, quail, duck, goose and the like. The "soluble" means water-soluble and solvent-soluble.

Specific example of resin emulsion incompatible with above (A) is ethylene-acryl copolymer, ethylene-vinyl acetate copolymer etc.

Content of the (C) component is preferably from 0.01 wt % to 10 wt %. Sufficient improving effect of the surface lubricity and the anti-blocking properties cannot be obtained below 0.01 wt %. And transparency is lowered over 10.0 wt %.

A coating material according to third aspect of the present invention includes at least one substance selected from a group consisting of water-soluble resin, resin emulsion and solvent resin (A); resin beads (B); and at least one substance selected from the group consisting of soluble protein and resin emulsion incompatible with the (A) component (C).

Details of the components (A), (B) and (C) are the same as described in the above first and second aspect of the present invention.

According to the present invention, coating material superior in adhesion with the sheets etc, heat sealability, surface lubricity of the base member and anti-blocking properties can be obtained.

The coating material of the present invention can be coated on any specific base member, which is, for example, transparent soft resin (such as polyvinyl chloride and olefin resin) sheet, enamel coated fabric.

The coating material of the present invention may be coated in any manner and general process such as use of gravure, offset, and comma coater etc. may be used.

A coating material according to fourth aspect of the present invention is characterized in further including a water-soluble amine additive (D) in addition to the above-described coating material for improving anti-blocking properties.

The water-soluble amine additive is added for improving adhesion with the base member. In the present invention, adhesion of the sheet is improved by the coating.

Specific example of the water-soluble amine additive is aminosilane (such as N- β (aminoetyl) γ-aminopropylmetyldimethoxysilane, N- β (aminoetyl) γ-aminopropylmetyltrimethoxysilane, γ-aminopropylmetyltrimethoxysilane, γ-aminopropylmetyltriethoxysilane) and polyoxyethylene-allylaminoether (such as polyoxyethylenelaurylaminoether and polyoxy-ethylenestearylaminoether).

The content of the water-soluble amine additive is 0.01 to 20% (solid content ratio) relative to the above-described components (A to C).

When the water-soluble additive content is too small, adhesion improvement cannot be expected and, when the water-soluble additive content is too much, coating film can be weakened.

Any coating method can be used for the coating material added with the water-soluble amine additive, which may be general methods such as gravure, offset, and comma coater.

The sheet processed with the coating material added with the water-soluble amine additive may be bonded by general adhesive (cyanoacrylate adhesive).

BEST MODE FOR CARRYING OUT THE INVENTION

First Embodiment

A coating material according to the present embodiment includes at least one substance selected from water-soluble resin, resin emulsion and solvent resin (A) and resin beads (B).

Specific example of the water-soluble resin is water-soluble acryl resin, water-soluble polyurethane resin etc.

Specific example of the resin emulsion is acryl emulsion, polyurethane emulsion etc.

Specific example of the solvent resin is a solution of urethane resin, acryl resin and the like in a solvent medium composed of at least one of DMF, MEK etc. The (A) component is contained therein for 0.1 to 50.0 wt %.

The resin beads (B) are polyethylene beads, acryl beads etc. The content of the beads is 0.01 wt % to 20.0 wt % and average particle size of the beads is not more than 20 $\mu$m.

Second Embodiment

A coating material according to the present embodiment includes at least one selected from water-soluble resin, resin emulsion and solvent resin (A), and at least one substance selected from soluble protein and resin emulsion incompatible with the above (A) component (C).

Specific example of the soluble protein is egg white, silk (fibroin), collagen, casein and the like.

The resin emulsion incompatible with the above (A) is ethylene-acryl copolymer etc.

A content of the above (C) component is 0.01 to 10 wt %.

Third Embodiment

A coating material according to the present embodiment includes at least one substance selected from water-soluble resin, resin emulsion and solvent resin (A), resin beads (B) and at least one substance selected from soluble protein and resin emulsion incompatible with the above (A) component (C).

Fourth Embodiment

A coating material according to the present embodiment further includes water-soluble amine additive (D) in addition to any one of the coating materials of the above-described first embodiment (component A+B), the second embodiment (component A+C) and the third embodiment (component A+B+C).

Specific example of the water-soluble amine additive is aminosilane, polyoxyethyleneallylaminoether, and the like.

A content of the water-soluble amine additive is 0.01 to 20% (solid content ratio) relative to the above-described components (A to C).

Experiments 1 to 3

The present Experiments corresponded to the first embodiment.

Coating material of the Experiment 1 included 1.0 wt % of water-soluble acryl resin (solid content 30%) as the water-soluble resin (A), 0.25 wt % of polyethylene beads as the resin beads (B), and 98.75 wt % of water.

Coating material of the Experiment 2 included 1.0 wt % of acryl emulsion as the resin emulsion (A) (solid content 30%) as the water-soluble resin (A), 0.25 wt % of polyethylene beads as the resin beads (B), and 98.75 wt % of water.

Coating material of the Experiment 3 included 0.1 wt % of solution of 20% urethane resin into DMF as the solvent resin (A), 0.25 wt % of acryl beads as the resin beads (B), and 98.75 wt % of water.

Experiments 4 to 6

The present Experiments corresponded to the second embodiment.

Coating material according to Experiment 4 contained 2.0 wt % of water-soluble acryl resin as the water-soluble resin (A), 0.1 wt % of egg white as a water-soluble protein (C) and 97.9 wt % of water.

Coating material according to Experiment 5 contained 2.0 wt % of acryl emulsion as the resin emulsion (A), 0.1 wt % of ethylene-acryl copolymer as the resin emulsion incompatible with (A) component (C), and 97.9 wt % of water.

Coating material according to Experiment 6 contained 2.0 wt % of solution of urethane resin into DMF as the solvent resin (A), 0.1 wt % of egg white as the soluble protein, and 97.9 wt % of water.

Experiments 7 to 9

The present Experiment corresponded to the third embodiment.

Coating material according to Experiment 7 contained 0.8 wt % of water-soluble acryl resin, 0.25 wt % of polyethylene beads, 0.05 wt % of egg white and 98.9 wt % of water.

Coating material according to Experiment 8 contained 0.8 wt % of acryl emulsion, 0.25 wt % of polyethylene beads, 0.05 wt % of egg white, and 98.9 wt % of water.

Coating material according to Experiment 9 contained 0.8 wt % of solution of urethane resin into DMF, 0.25 wt % of acryl beads, 0.1 wt % of ethylene-acryl copolymer, and 98.85 wt % of water.

Comparisons 1 to 3

Coating material according to Comparison 1 contained 0.5 wt % of corn starch and 99.5 wt % of water.

Coating material according to Comparison 2 contained 0.8 wt % of water-soluble acryl resin and 99.2 wt % of water.

Coating material according to Comparison 3 contained 0.795 wt % of water-soluble acryl resin, 0.005 wt % of water-soluble silicone resin and 99.2 wt % of water.

Characteristic Evaluation 1

The coating materials according to the above Experiments and Comparisons were coated onto a transparent olefin sheet using a gravure coater (150 mesh), and were dried at 100° C. for 10 seconds.

Subsequently, haze, anti-blocking properties, cutting ability, surface lubricity, printability, print workability, heat sealability, workability during manufacture and surface-damage durability were evaluated for obtained sheets. The evaluation results are shown in Table 1.

Incidentally, evaluation in the table is shown as ○: good, Δ: ordinary and X: bad. Evaluation standards of each item are as follows.

The anti-blocking properties were evaluated by checking existence of blocking in being peeled out of wound raw fabric. ○ was marked when no blocking was observed, Δ was marked when certain blocking was observed by blocking mark did not remain in being peeled off, and X was marked when wrinkle or blocking mark remained thereon.

The cutting ability was evaluated by cutting the sheet by workers while actually being piled up to check existence of blocking and whether the sheets could be handled one by one and the sheets were easy to peel off.

The surface lubricity was evaluated by static and kinetic friction according to ASTM D1894 standard. X was marked when the kinetic friction was not less than 1, Δ was marked when the kinetic friction was not less than 0.5 and less than 1.0, and ○ was marked when the kinetic friction was less than 0.5.

Printability was evaluated by checking results after gravure printing of aqueous and solvent ink with naked eye. Thereafter, peelability was checked by attaching an adhesive tape to printing surface and peeling thereof. ○ was marked when the ink did not peel off, and X was marked when even a small amount thereof was peeled off.

Print workability was checked by dirt of a printing head and X was marked when cleaning was required on account of powder blot etc.

Heat sealability was checked by heat sealing temperature. X was marked when the resin sheet was adhered to a sealing bar on account of excessively high temperature and ○ was marked when the sheet shows similar temperature condition as the base film.

X was marked for workability during manufacture when there were troubles such as scattering of powder and roller's becoming dirty.

Surface damage durability was evaluated based on scratches after rubbing the sheets with each other for one hundred times by hand. X was marked when there were prominent scratches and ○ was marked when there were no prominent scratches.

TABLE 1

| | Haze (%) | Anti-blocking properties | Cutting ability | Surface lubricity | Printability | Print workability | Heat sealability | Workability during manufacture | Surface damage durability |
|---|---|---|---|---|---|---|---|---|---|
| Experiment 1 | 2.8 | Δ | Δ | Δ | ○ | ○ | ○ | ○ | ○ |
| Experiment 2 | 2.6 | Δ | Δ | Δ | ○ | ○ | ○ | ○ | ○ |
| Experiment 3 | 2.9 | Δ | Δ | Δ | ○ | ○ | ○ | ○ | ○ |
| Experiment 4 | 2.7 | ○ | ○ | ○ | ○ | ○ | Δ | ○ | ○ |
| Experiment 5 | 2.7 | ○ | ○ | ○ | ○ | ○ | Δ | ○ | ○ |
| Experiment 6 | 2.8 | ○ | ○ | ○ | ○ | ○ | Δ | ○ | ○ |
| Experiment 7 | 2.6 | ○ | ○ | ○ | ○ | ○ | ○ | ○ | ○ |
| Experiment 8 | 3 | ○ | ○ | ○ | ○ | ○ | ○ | ○ | ○ |
| Experiment 9 | 2.7 | ○ | ○ | ○ | ○ | ○ | ○ | ○ | ○ |
| Comparison 1 | 3.2 | ○ | ○ | ○ | ○ | X | ○ | X | X |

TABLE 1-continued

|  | Haze (%) | Anti-blocking properties | Cutting ability | Surface lubricity | Printability | Print workability | Heat sealability | Workability during manufacture | Surface damage durability |
|---|---|---|---|---|---|---|---|---|---|
| Comparison 2 | 2.5 | x | x | x | ○ | ○ | x | ○ | ○ |
| Comparison 3 | 3 | Δ | Δ | ○ | x | x | x | x | ○ |

According to Table 1, the coating material of Experiments 1 to 3 had good heat sealability on account for including the above (A) and (B).

The coating materials of Experiments 4 to 6 had good surface lubricity, anti-blocking properties and cutting ability on account for including the above (A) and (C).

The coating materials of Experiments 7 to 9 showed all of the good characteristic from haze to surface damage durability since the coating materials contained the above (A), (B) and (C).

On the other hand, though anti-blocking ability was given by spraying corn starch in Comparison 1, workability at job site was bad since powdering work was required. Further, since the powder adhered to the roller during fabrication such as printing, the roller had to be frequently cleaned.

The coating material of Comparison 2 showed bad heat sealability since the coating material did not contain (B), and showed bad anti-blocking properties since the coating material did not contain (C).

The coating material of Comparison 3 showed bad heat sealability since the coating material did not contain (B). Though surface lubricity was given by adding silicone resin, printability thereof was deteriorated.

Experiment 10

The present experiment corresponded to the above fourth embodimnent.

The coating material of Experiment 10 included 0.5% of N-β (aminoetyl) γ-aminopropylmethyltrimethoxysilane as a water-soluble amine additive in addition to the coating material of Experiment 1 (including 1.0 wt % of water-soluble acryl resin (solid content 30%) as a water-soluble resin (A), 0.25 wt % of acryl beads as resin beads (B) and 98.75 wt % of water).

The coating material was coated onto a polypropylene sheet using a gravure coater (150 mesh) and dried at 100° C. for 10 seconds.

Comparison 4

A polypropylene sheet used in the Example 10 without any coating thereon was prepared as Comparison 4.

Characteristic Evaluation 2

After primer coating to the sheet coated with the coating material, the sheet was bonded by a cyanoacrylate adhesive. Further, bonding by the cyanoacrylate adhesive without primer coating was also conducted. Disruptive strength of respective bonded portions was tested after bonding. The results are shown in table 2.

TABLE 2

|  | Experiment 10 | Comparison 4 |
|---|---|---|
| Primer coating + adhesive | ○ | Δ~○ |
| Adhesive alone | Δ~○ | X |

X: little bonding strength
Δ: 50% of the material was disrupted
○: the material was completely disrupted Accordingly, it could be confirmed that sufficient bonding strength was obtained even without primer coating according to the present invention.

Industrial Applicability as described above, the coating material according to the present invention is suitable for coating for improving anti-blocking properties when a resin sheet having flat surface is cut while being wound to a roller or being superposed.

What is claimed is:

1. In a sheet or film having a coating material for preventing blocking between superposed sheets or films, the improvement characterized in that said coating material comprises: (A) at least one substance selected from the group consisting of a water-soluble resin, resin emulsion and solvent resin, (B) resin beads and (D) a water-soluble amine additive.

2. In a sheet or film having a coating material for preventing blocking between superposed sheets or films, the improvement characterized in that the sheet or film is made of a resinous material and said coating material comprises: (A) at least one substance selected from the group consisting of a water-soluble resin, resin emulsion and solvent resin, and (C) at least one member selected from the group consisting of a soluble protein and resin emulsion incompatible with (A).

3. In a sheet or film having a coating material for preventing blocking between superposed sheets or films, the improvement characterized in that said coating material comprises: (A) at least one substance selected from the group consisting of a water-soluble resin, resin emulsion and solvent resin; (B) resin beads; and (C) at least one member selected from the group consisting of a soluble protein and resin emulsion incompatible with (A).

4. The sheet or film having a coating material according to claim 2, wherein the coating material further comprises a water-soluble amine additive (D).

5. The sheet or film having a coating material according to claim 3, wherein the coating material further comprises a water-soluble amine additive (D).

6. The sheet or film having a coating material according to claim 1, wherein the sheet or film is made of a resinous material.

7. The sheet or film having a coating material according to claim 3, wherein the sheet or film is made of a resinous material.

8. The sheet or film having a coating material according to claim 1, wherein the coating material further comprises a soluble protein selected from the group consisting of whey, egg white, silk, collagen, casein, gelatin, sericin and serum protein.

9. The sheet or film having a coating material according to claim 1, wherein (A) is present in an amount of from 0.1 to 50 wt. % and (B) is present in an amount of from 0.01 to 20 wt. %.

10. The sheet or film having a coating material according to claim 2, wherein (A) is present in an amount of from 0.1 to 50 wt. % and (C) in an amount of from 0.01 to 10 wt. %.

11. The sheet or film having a coating material according to claim 3, wherein (A) is present in an amount of from 0.1 to 50 wt. %, (B) is present in an amount of from 0.01 to 20 wt. % and (C) is present in an amount of from 0.01 to 10 wt. %.

12. The sheet or film having a coating material according to claim 1, wherein the resin beads have an average particle size not exceeding 20 $\mu$m.

13. The sheet or film having a coating material according to claim 3, wherein the resin beads have an average particle size not exceeding 20 $\mu$m.

14. The sheet or film having a coating material according to claim 12, wherein the resin beads are selected from the group consisting of polyethylene beads, acryl beads, nylon beads, polyester beads and polypropylene beads.

15. The sheet or film having a coating according to claim 13, wherein the resin beads are selected from the group consisting of polyethylene beads, acryl beads, nylon beads, polyester beads and polypropylene beads.

16. The sheet or film having a coating material according to claim 6, wherein the resinous material is selected from among a polyolefin and polyvinyl chloride.

17. The sheet or film having a coating material according to claim 7, wherein the resinous material is selected from among a polyolefin and polyvinyl chloride.

18. The sheet or film having a coating material according to claim 7, wherein the resinous material is selected from among a polyolefin and polyvinyl chloride.

19. In a method of preventing blocking between superposed sheets or films, the improvement comprising applying a coating material comprising: (A) at least one substance selected from the group consisting of a water-soluble resin, resin emulsion and solvent resin, and at least one of (B) resin beads and (C) at least one member selected from the group consisting of a soluble protein and resin emulsion incompatible with (A) onto a sheet or film.

20. The method of claim 19, wherein the coating material additionally comprises (D) a water-soluble amine additive.

21. The method of claim 19, wherein the sheets or films are made of a resinous material.

22. The method of claim 19, wherein the coating material additionally comprises a soluble protein selected from the group consisting of whey, egg white, silk, collagen, casein, gelatin, sericin and serum protein.

23. The method of claim 21, wherein the sheets or films are a polyolefin.

24. The method of claim 21, wherein the sheets or films are polyvinyl chloride.

* * * * *